United States Patent [19]

Kondo

[11] Patent Number: 4,930,079
[45] Date of Patent: May 29, 1990

[54] THROTTLE-VALVE OPENING DEGREE CONTROL FOR AUTOMATIC STEP-WISE TRANSMISSION SYSTEM

[75] Inventor: Shigeki Kondo, Hyogo, Japan

[73] Assignee: Mitsubishi Denki Kabushiki Kaisha, Tokyo, Japan

[21] Appl. No.: 212,372

[22] Filed: Jun. 27, 1988

[30] Foreign Application Priority Data

Jul. 2, 1987 [JP] Japan .................. 62-167175

[51] Int. Cl.$^5$ .................. G06F 15/20; H04L 25/06
[52] U.S. Cl. .................. 364/424.1; 364/431.07; 364/571.05; 73/118.1
[58] Field of Search .............. 364/559, 571.02, 571.04, 364/571.05, 431, 05, 431.06, 431.07, 431.09, 424.1; 73/117, 117.2, 117.3, 118.1

[56] References Cited

U.S. PATENT DOCUMENTS

| 4,490,804 | 12/1984 | Martinsons | 364/571.05 |
| 4,515,009 | 5/1985 | Hasegawa et al. | 73/118.1 |
| 4,581,924 | 4/1986 | Otobe et al. | 73/118.1 |
| 4,612,615 | 9/1986 | Murakami | 364/431.07 |
| 4,679,440 | 7/1987 | Okamura | 73/118.1 |
| 4,737,915 | 4/1988 | Hosaka | 364/431.07 |
| 4,825,372 | 4/1989 | Yasue et al. | 364/424.1 |

FOREIGN PATENT DOCUMENTS 53-105639 9/1978 Japan .

Primary Examiner—Parshotam S. Lall
Assistant Examiner—Christopher L. Makay
Attorney, Agent, or Firm—Sughrue, Mion, Zinn, Macpeak & Seas

[57] ABSTRACT

To control an automatic step-wise transmission system of a vehicle including a vehicle engine, the controlling steps include:

acquiring real throttle-valve opening degree data of the vehicle engine;

checking whether or not conditions of the vehicle engine are in a start-up status when the real throttle-valve opening degree data is acquired;

calculating a difference between the real throttle-valve opening degree data acquired during the determination of the start-up status and reference throttle-valve opening degree data previously stored so as to obtain a correction value for the real throttle-valve opening degree data;

correcting the real throttle-valve opening degree data based upon the correction value to produce controlling throttle-valve opening degree data; and, controlling the automatic step-wise transmission system based upon the controlling throttle-valve opening degree data so as to perform a gear-changing operation of the vehicle engine.

5 Claims, 5 Drawing Sheets

THROTTLE-VALVE OPENING DEGREE CONTROL FOR AUTOMATIC STEP-WISE TRANSMISSION SYSTEM

BACKGROUND OF THE INVENTION

The present invention relates to a method of, and apparatus for, controlling an automatic step-wise transmission system for automobiles, and, more particularly, to a method of, and apparatus for, controlling the automatic step-wise transmission system to suppress a gear-changing shock which is caused by the hydraulic pressure control of various kinds of mechanisms in the gear-changing operation.

As one of the conventional methods of controlling the engine for automobiles, there has been proposed a controlling method wherein an offset value of a throttle-valve opening degree of a throttle valve when an engine key switch is turned on is sensed electronically, and the difference in the throttle-valve opening degrees also is adjusted. For example, such a controlling method is disclosed in Japanese KOKAI (Disclosure) Patent Application No. 53-105639 (laid open on September 13, 1978).

However, regarding such a conventional engine control method, no technical concept teaching the offset value of the throttle-valve opening degree for the controls, other than the engine control, has been proposed. The following reasons can be considered as causing the absence of such a technical idea.

That is, when the engine start key is turned on, the throttle-valve opening degree is not set always to "0". Further, since the throttle-valve opening degree which is not initialized to "0" is changed for the engine control, there is a problem such that it is difficult to measure the offset value. Alternatively, in the control of the automatic step-wise transmission system, an error present in the throttle-valve opening degree under the engine idling state may cause a problem, rather than when the throttle valve is closed fully. Therefore, the error present in the idling state of the engine requires correction.

There is an actual problem such that there are many fluctuations in adjustment of the throttle-valve opening degree. Particularly, the engine torque largely changes due to a slight difference of the opening degree. In addition, an electronic reading error of the throttle-valve opening degree or adjustment fluctuations near the idling speed range in which a car driver feels easily as a shock, become one of the causes of deterioration of the drivability of the vehicle.

The present invention solves the foregoing problems, and therefore an object of the invention is to provide a method of controlling an automatic step-wise transmission system in which the gear-changing shock based on the adjustment error of the throttle-valve opening degree, or the error due to an aging effect of the sensor to detect the throttle-valve opening degree, can be suppressed. Particularly, it is possible to emphasize the suppressing and controlling effects of the shock which can be felt most easily as a gear-changing shock at a position near the throttle-valve opening degree during the vehicle idling state and which occurs at a critical point in the control of the transmission system.

A further object of the invention is to provide an apparatus for controlling an automatic step-wise transmission system having the foregoing features.

SUMMARY OF THE INVENTION

These objects and other features of the present invention are accomplished by providing a method for controlling an automatic step-wise transmission system of a vehicle including a vehicle engine, comprising the steps of:

acquiring real throttle-valve opening degree data of the vehicle engine;

checking whether or not conditions of the vehicle engine are under learning conditions when said real throttle-valve opening degree data is acquired;

calculating a difference between said real throttle-valve opening degree data acquired under the learning conditions and reference throttle-valve opening degree data previously stored so as to obtain a correction value for said real throttle-valve opening degree data;

correcting said real throttle-valve opening degree data based upon said correction value to produce controlling throttle-valve opening degree data; and, controlling the automatic step-wise transmission system based upon said controlling throttle-valve opening degree data so as to perform a gear-changing operation of the vehicle engine.

Furthermore, according to the invention, an apparatus for controlling an automatic step-wise transmission system of a vehicle including a vehicle engine, comprising:

means (106; 107) for acquiring real throttle-valve opening degree data of the vehicle engine;

means (132) for checking whether or not conditions of the vehicle engine are under learning conditions when said real throttle-valve opening degree data is acquired;

means (102) for previously storing reference throttle-valve opening degree data;

means (134; 136) for calculating a difference between said real throttle-valve opening degree data acquired under the learning conditions and said reference throttle-valve opening degree data previously stored in said storing means (102) so as to obtain a correction value for said real throttle-valve opening degree data;

means (104) for temporarily storing said correction value derived from said calculating means (134; 136);

means (139) for correcting said real throttle-valve opening degree data by adding said correction value thereto so as to produce controlling throttle-valve opening degree data; and, means (138) for controlling the automatic step-wise transmission system based upon said controlling throttle-valve opening degree data so as to perform a gear-changing operation of the vehicle engine.

BRIEF DESCRIPTION OF THE DRAWINGS

For a better understanding of the present invention, reference is made to read the descriptions in conjunction with the accompanying drawings, in which.

DETAILED DESCRIPTION OF THE PREFERRED EMBODIMENTS

A method of controlling an automatic step-wise transmission system according to the invention is realized on the basis of a basic idea which will be explained hereinbelow.

That is, this control method compares the actual throttle-valve opening degree in the idling state within a neutral range with the designated standard throttle-valve opening degree of an idle speed. In the first-mentioned throttle-valve degree, the engine speed is held within a predetermined speed range, and a changing ratio (which will be explained hereinlater) of the throttle-valve opening degree directly indicative of the engine power is almost zero, and no large electrical load such as an air conditioner is loaded. Thereafter, the actual throttle-valve opening degree is corrected by use of the comparison difference between them, and the corrected throttle-valve opening degree is used for the gear-changing control in the automatic step-wise transmission system.

ARRANGEMENT OF ELECTRONIC CONTROL UNIT

Figure 1:
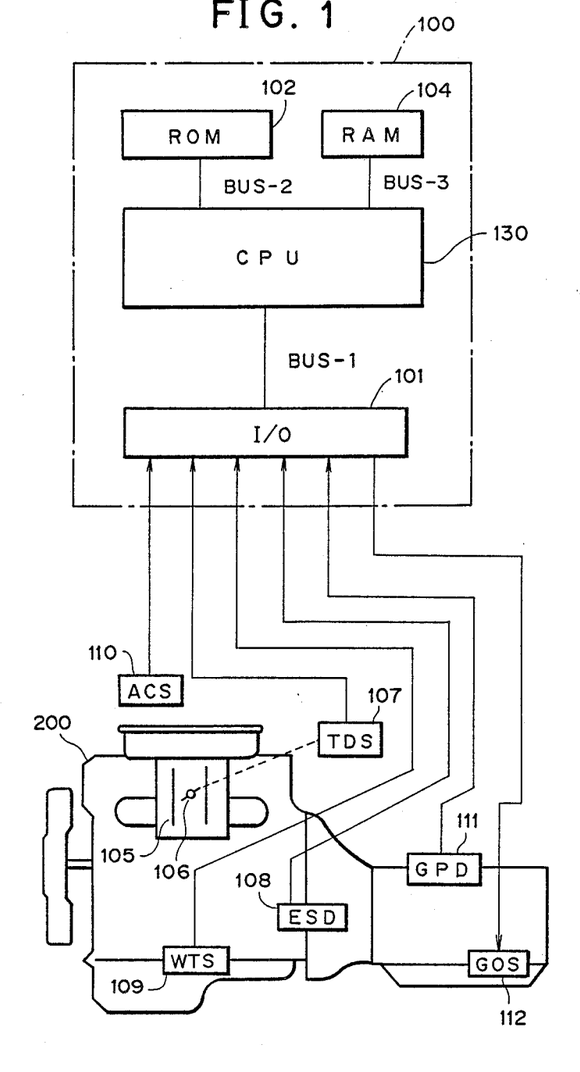
FIG. 1 is a schematic diagram for explaining an electronic control unit operable in conjunction with an engine, according to one preferred embodiment of the invention.
Figure 2:
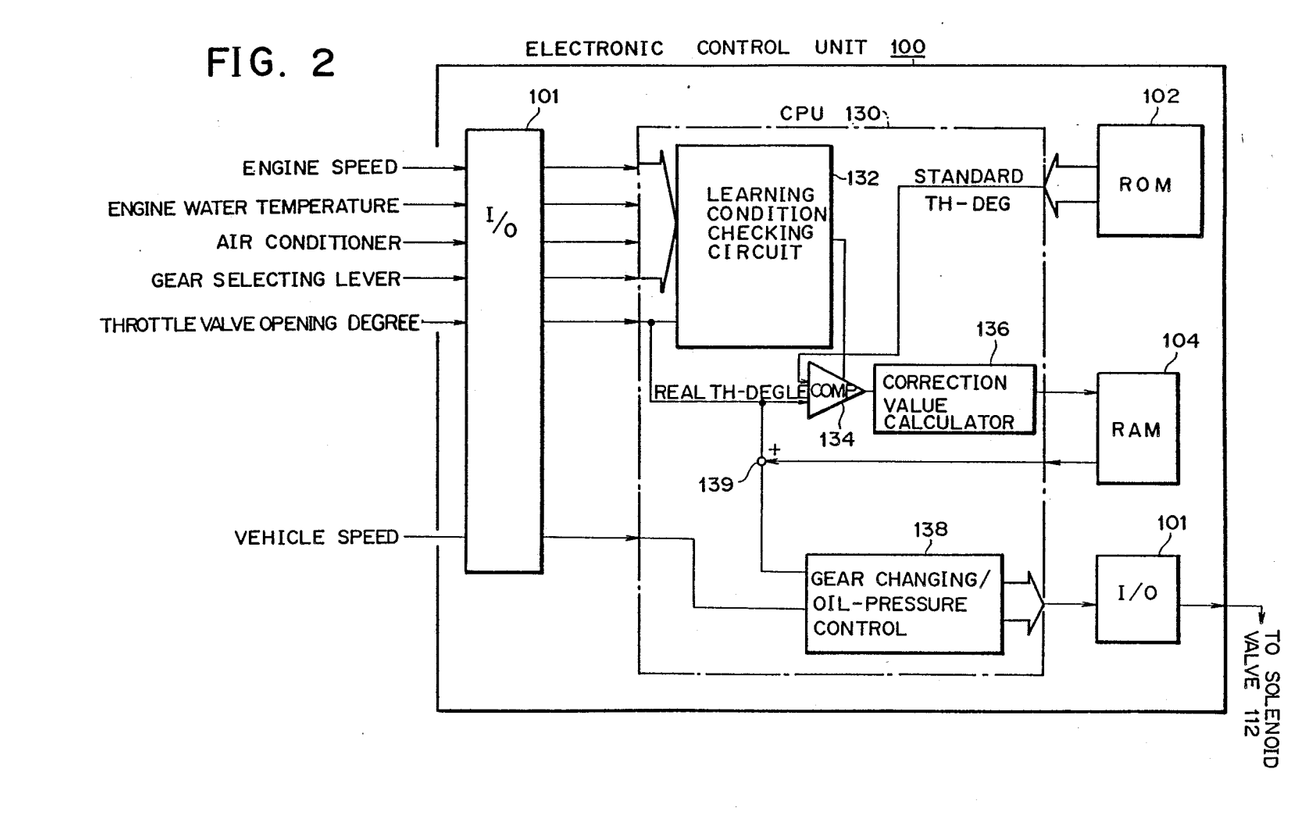
FIG. 2 is a schematic block diagram of an internal circuit arrangement of the electronic control unit illustrated in FIG. 1.

Referring now to FIGS. 1 and 2, an arrangement of an electronic control unit for an automatic step-wise transmission system will be described, in which the actual throttle-valve opening degree is corrected for controlling the automatic step-wise transmission system.

First, in FIG. 1, an electronic control unit 100 of the first preferred embodiment according to the invention is constructed mainly of:

an input/output port 101 for receiving sensor signals from various types of sensors installed in an engine 200 (will be explained hereinlater) and for transmitting control signals to members to be controlled;

a CPU (central processing unit) 130 connected to the input/output port 101 by a first data bus "BUS-1", and for performing various kinds of arithmetic operating processes (will be explained hereinafter);

an ROM (read-only memory) 102 connected to the CPU 130 by a second data bus "BUS-2", and for previously storing the designed standard throttle-valve opening degree at an idle speed; and an RAM (random access memory) connected to the CPU 130 by a third data bus "BUS-3", and for temporarily storing a correction value to obtain the throttle-valve opening degree data (will be explained hereinlater).

Alternatively, the following various types of sensors and members to be controlled are attached to the engine 200 as illustrated in FIG. 1.

First, a throttle-valve opening degree sensor (TDS) 107 is connected to a throttle valve 106 in an intake air passage 105 in the engine 200, and measures the opening degree of the throttle-valve 106. Further, an engine speed detector (ESD) 108 and an engine-water temperature sensor (WTS) 109 are attached to the engine 200. An air conditioner switch (ACS) 110 is connected to the I/O port 101. The ON/OFF control of an air conditioner (not shown) is performed by the switch 110, and the ON/OFF control signal is output from the switch 110. In addition, a gear-selecting-lever position detector (GPD) 111 and a solenoid valve for controlling a gear-changing oil pressure sensor (GOS) 112 are connected to the engine 200.

FIG. 2 is a block diagram showing an internal arrangement of the electronic control unit 100. In CPU 130, various kinds of sensor data such as engine speed, engine-water temperature, and throttle-valve opening degree are supplied to a learning-condition checking circuit 132 through the I/O port 101. In the preferred embodiment, the learning conditions are as follows:

(1) A check is made whether or not the engine speed of the engine 200 measured by the engine speed detector 108 is present within a predetermined engine speed range;

(2) A check is made whether or not the temperature detected by the engine-water temperature sensor 109 is sufficiently high, and, hence if, the warming-up of the engine 200 has already been completed;

(3) A check is made whether or not the air conditioner (not shown) is putting a load on the engine 200 by investigating the switch signal derived from the air conditioner switch 110; and (4) A check is made whether or not the changing gear is set in the neutral range by the detection signal of the gear-selecting-lever position detector 111.

(5) A further check is made whether or not the changing ratio of the throttle-valve opening degree is almost zero by the sensor signals from the throttle-valve opening degree sensor 107.

Accordingly, the learning-condition checking circuit 132 checks whether all of the above-described learning conditions are satisfied or not.

A check signal indicating that all of the learning conditions can be satisfied is supplied to a comparator 134 from the learning condition checking circuit 132. The real (actual) throttle-valve opening degree data is compared with the designed standard throttle-valve angle data, which has previously been stored in the ROM 102, by the comparator 134. That is, when all of the learning conditions are satisfied, the comparison between two pieces of opening degree data is performed. On the basis by the comparison result of the comparator 134, a desired correction value calculated by a correction value calculator 136 is stored temporarily in RAM 104. On the other hand, although not described in the arrangement of FIG. 1 mentioned above, vehicle velocity data is input into a gear changing/oil-pressure control circuit 138 through the I/O port 101. Then the desired correction value is read out of the RAM 104, and is added to the real throttle-valve opening angle. From the result of this addition, the desired throttle-valve opening degree data for control is derived. This control throttle-valve opening degree data is input into the gear changing/oil-pressure control circuit 138, and a gear-changing control signal is generated on the basis of the foregoing vehicle velocity data, and thereafter, is supplied to the solenoid valve 112 (FIG. 1) through the I/O port 101, thereby allowing a predetermined. gear-changing operation.

AUTOMATIC STEP-WISE TRANSMISSION CONTROL OPERATION

Referring now to the flowcharts shown in FIGS. 3 and 4, an automatic step-wise transmission control operation, i.e., automatic gear-changing control operation, will be described which is performed mainly in the electronic control unit 100 illustrated in FIGS. 1 and 2.

Figure 3:
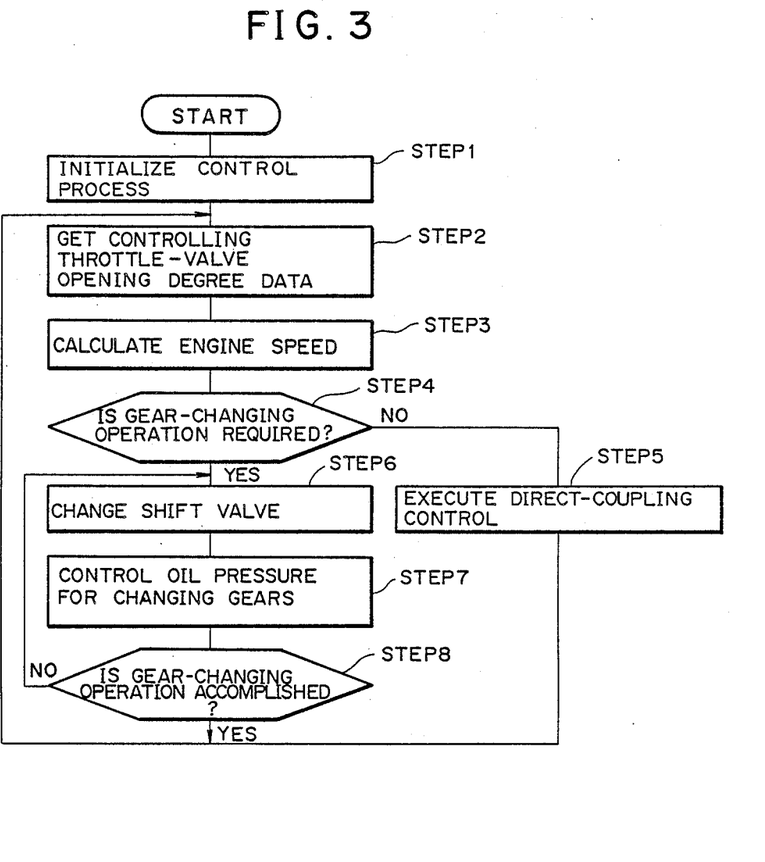
FIG. 3 is a flowchart for explaining the entire control operation of the electronic control unit shown in FIG. 1.
Figure 4:
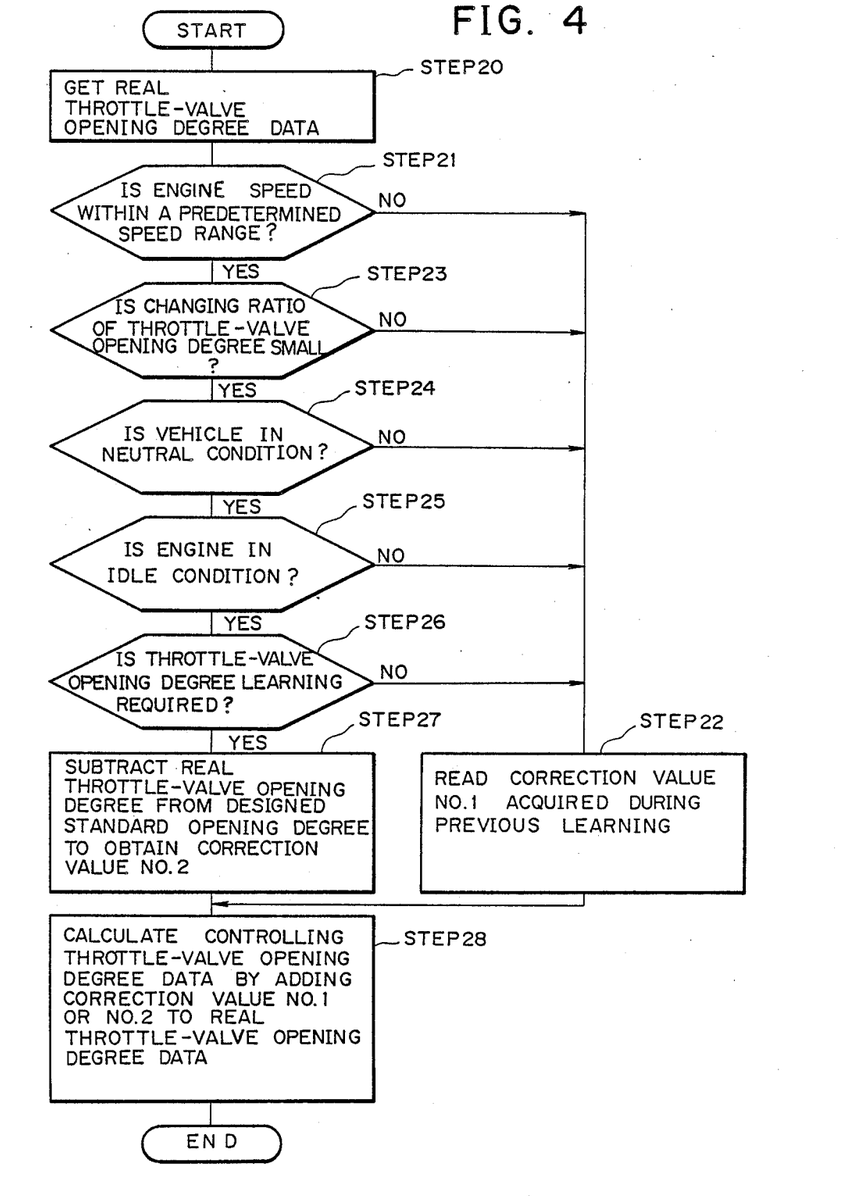
FIG. 4 is a flowchart for explaining the correcting operation of the throttle-valve opening degree performed in the electronic control unit in FIG. 1.

FIG. 3 shows the flowchart for explaining the calculation of the correction amount of the throttle-valve opening degree data which is executed mainly by the electronic control unit 100 in the first embodiment shown in FIGS. 1 and 2, and the control for the gear-changing operation which is performed on the basis of the correction amount.

In the flowchart of FIG. 3, the control process is initialized in step 1. In step 2, the actual opening degree of the throttle-valve 106 is measured by the throttle-valve opening degree sensor 107 shown in FIG. 1. Further, a predetermined correcting operation as will be explained hereinlater is executed. The detailed operations in step 2 will be described with reference to FIG. 4. Desired controlling throttle-valve opening degree data is collected finally in step 2.

In step 3, the speed (which is represented generated by a revolution per minute) of the engine 200 is calculated in response to the detector signal from the engine speed detector 108 shown in FIG. 1. Further, in step 4, a determination is made whether the gear-changing operation is required based on both of the controlling throttle-valve opening degree data and the engine speed data. If the gear-changing operation is unnecessary, step 5 follows and the direct-coupling control is executed. Since this control operation is not concerned directly with the control type in the present invention, a further detailed description is omitted here.

If YES i.e., the gear-changing operation is required in step 4, step 6 follows, and a shift valve (not shown) is switched thereby to start the gear-changing operation. In step 7, the hydraulic (oil) pressure control operation, which is necessary when the gear is changed, is executed based on the controlling throttle-valve opening degree data obtained in step 2. That is, the hydraulic pressure control incorporates not only the hydraulic pressure control to select a proper change gear, but also the hydraulic pressure control operations for the brake, clutch, and the like.

In step 8, a determination is made whether the gear-changing operation has been completed. If not completed (NO), the processing routine is returned to step 6. If the operation is completed (YES), the processing routine returns to step 2 for the succeeding gear-changing operation.

ACQUISITION OF CONTROLLING THROTTLE-VALVE OPENING DEGREE DATA

A method of collecting the controlling throttle-valve opening degree data as described in step 2 in FIG. 3 will now be explained with reference to FIG. 4.

First, in step 20, the actual throttle-valve opening degree data is acquired by the throttle-valve opening degree sensor 107 shown in FIG. 1. The opening degree sensor signal is supplied to the CPU 130 through the I/O port 101 of the electronic control unit 100 in FIG. 1. In step 21, a determination is made whether or not the engine speed of engine 20 is within the predetermined speed range.

In step 21, it is determined whether the engine is presently in the idling speed state or not. Namely, it is known that during the idling operation, the gear-changing shock which most adversely affects the vehicle drivability is recognized readily as mentioned above. The advantages of the gear-changing control method of the invention are achieved typically during the idling operation. If a "NO" is given in step 21 the process continues to step 22 reads out correction value No. 1 for the controlling throttle-valve opening degree data acquired during the previous learning of the RAM 104 in FIG. 1. This reading operation will be described hereinlater.

If the engine speed of the engine 200 is in the predetermined engine speed, step 23 follows and determines whether the change ratio of the throttle-valve opening degree is small or not. A small changing ratio of the throttle-valve opening degree implies that a large fluctuation does not exist in the actual throttle-valve opening degree acquired at every learning timing, which will be explained hereinlater. To make such a determination, several pieces of the actual throttle-valve opening degree data are acquired during several learning time periods, thereby to determine the pressure or absence of the fluctuation. If a "NO" results in step 23, step 22 follows. If a "YES" results in step 23, step 24 follows and a determination is made whether the vehicle or gear is in the neutral condition or not. If a "NO" results in step 24, step 22 follows. If a "YES" results in step 24, step 25 follows, and a determination is made whether the engine is in the idling operation state or not. If a "NO" results in step 25, step 22 follows. If a "YES" results in step 25, step 26 follows. It should be noted that, the discriminating process of the idling operation state of the vehicle which is executed in step 25 is an extremely important factor for the control method of the invention. If a "YES" results in step 25, step 26 follows, and a determination is made whether the throttle-valve opening degree learning timing has come or not. In other words, in step 26, a determination is made whether all of the foregoing learning conditions are satisfied or not. Namely, it is decided whether the throttle-valve opening degree learning operation should be executed or not, based on the various kinds of conditions data such as real throttle-valve opening degree data which were acquired in steps 21 through 25. For instance, when the sensor signal derived from the engine-water temperature sensor 109 shown in FIG. 1 is processed by the learning condition checking circuit 132 in the CPU 130, if the engine-water temperature is lower than a predetermined temperature, that is, if the engine is in the warming-up state, the answer in step 26 is "NO", and hence, step 22 follows. Alternatively, if the temperature is equal to or exceeds this predetermined temperature, namely, if the engine is in the normal operating mode, the learning operation is executed only when the other learning conditions are satisfied. In the preferred embodiment, this learning time is set to one second.

The control processes in steps 20 through 25 described above, are executed repetitively eight times in this embodiment, to thereby acquire desired data. Based on these data, a it is determined whether the learning timing for the throttle-valve opening angle has come or not in step 26. If a "NO" results step 22 follows, and the correction value No. 1 acquired by the preceding learning is read out of the RAM 104. Namely, this control step implies that the present condition is not yet ready for the learning timing.

Alternatively, if a "YES" results in step 26, step 27 follows so as to obtain a desired correction value No. 2. In this case, the designed standard throttle-valve opening degree data at the idle speed which has been stored previously in the ROM 102 in FIG. 1 is read out. The actual throttle-valve opening degree data collected thus for is subtracted from the readout data, thereby to obtain the desired correction value No. 2.

The correction value No. 2 thus obtained in this manner is stored into the RAM 104.

In step 28, the correction value No. 2 calculated in step 27 is read out and added to the actual throttle-valve opening degree data collected by the control processes in steps 20 through 27 described above, and, in other words, collected when all of the learning conditions are satisfied. This addition is performed by an adder 139 shown in FIG. 2, and the result is used as the final desired controlling throttle-valve opening degree data. Alternatively, if the answer in each of the steps 21 through 26 is "NO", correction value No. 1 which was determined by the preceding learning is added similarly to the actual throttle-valve opening degree data acquired in step 20, thereby to obtain the final desired controlling throttle-valve opening degree data.

For example, assume that a vehicle has a standard designed throttle-valve opening degree set to 5% in the idling state, but that the actual throttle-valve opening degree when the engine of this vehicle is in the idle condition is detected as 6%. As a result, by electronically reading the actual throttle-valve opening degree as a value which is decreased by 1% from the detected opening degree as a whole, the subsequent gear-changing control and the slip control, or direct coupling control, of the torque converter are executed. That is, a predetermined control process can be performed by applying predetermined correction values to all of the throttle-valve opening degrees (0% to 100%) by use of the correction value No. 2 calculated near the throttle-valve opening degree in the idling state.

By executing the foregoing series of control processes, the acquisition of the controlling throttle-valve opening degree data can be accomplished.

MODIFICATIONS

Figure 5:
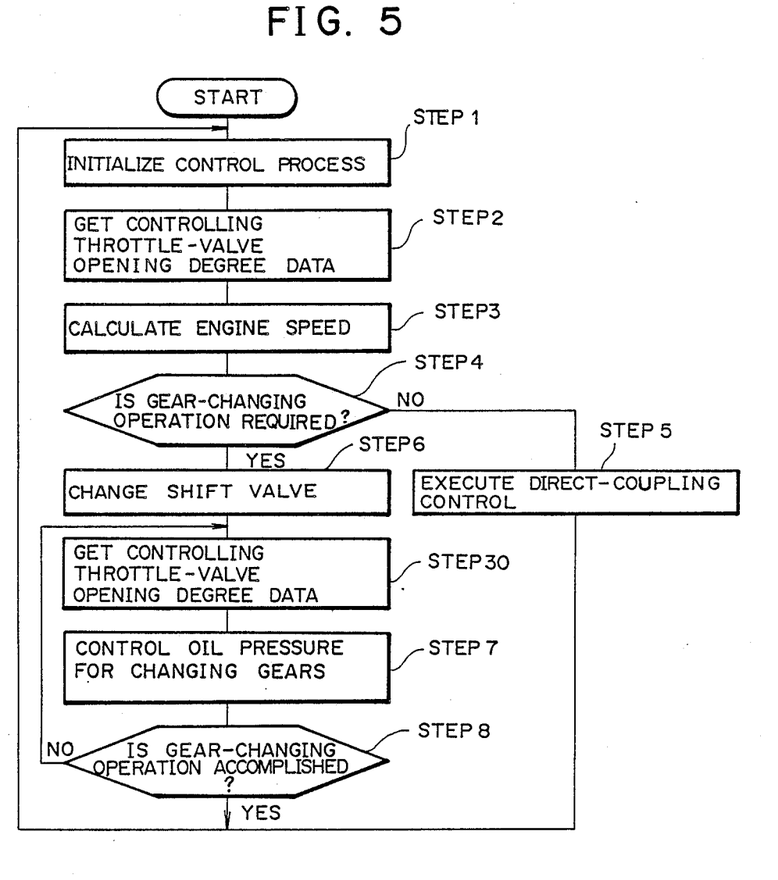
FIG. 5 is a flowchart for explaining the correcting operation of the throttle-valve opening degree performed, according to another preferred embodiment of the invention.

According to the invention, not only the foregoing embodiments but also various modifications may be realized. For example, in the first embodiment shown in the flowchart of FIG. 3, the controlling process to acquire the controlling throttle-valve opening degree data was executed only once. As shown by step 30 in FIG. 5, collecting the controlling throttle-valve opening degree data can be also provided between steps 6 and 7.

In this case, as compared with the first embodiment of FIG. 3, there is an advantage such that by acquiring the controlling throttle-valve opening degree data twice and by executing the gear-changing operation based on these data, the gear-changing shock produced in the gear-changing operation can be reduced, since a relatively longer time duration is needed for the gear-changing operation in steps 4 and 6, and, therefore, the actual throttle-valve opening degree changes during this time period and the gear-changing shock can be suppressed.

Additionally, in the foregoing embodiments, the throttle-valve opening degree learning has been performed during the normal operation. However, the invention is not limited to this example, but the control method of the invention can be applied also during the warming-up operation.

While the invention has been described in detail, the particular advantages of the present invention are achieved as follows:

The idling state of the engine first is determined under the learning conditions such that the engine speed lies within the predetermined range, the changing ratio of the actual throttle-valve opening degree is almost zero, and the engine is in the neutral range where no electrical load exists upon the engine. Then, the real throttle-valve opening degree at that time is compared with the designed standard throttle-valve opening degree at an idle speed. Thereafter, the actual throttle-valve opening degree is corrected by the difference between these opening degrees, and the corrected throttle-valve opening degree is used for performing the gear-changing control. Therefore, the gear-changing shock due to the adjustment error of the throttle-valve opening degree and the aging effect of the throttle-valve opening degree sensor can be reduced. Particularly, the advantages of the invention can be obtained at a critical point near the throttle-valve opening degree in the idling state at which the largest gear-changing shock is felt readily and is difficult to suppress.

What is claimed is:

1. A method for regulating an automatic step-wise transmission system of a vehicle including a vehicle engine, comprising the steps of:

sensing real throttle-valve opening degree sensor data of the vehicle engine;

determining whether the vehicle engine is under start-up conditions when said real throttle-valve opening degree sensor data is sensed;

calculating a difference between said real throttle-valve opening degree sensor data sensed under the start-up conditions and reference throttle-valve opening degree data previously stored so as to obtain a correction value for said real throttle-valve opening degree sensor data;

correcting said real throttle-valve opening degree data by adding said correction value to produce controlling throttle-valve opening degree data; and controlling the automatic step-wise transmission system by inputting said controlling throttle-valve opening degree data to as to produce a gear-changing control signal and to perform a gear-changing operation of the vehicle engine;

wherein said determining step further includes the steps of:

determining whether an engine speed of the vehicle engine is within a predetermined engine speed range;

determining whether a plurality of said sensed real throttle-valve opening degree sensor data contained fluctuation; and determining whether the engine is in an idling operation state by comparing said real throttle valve opening degree sensor data and said reference throttle valve opening degree data.

2. A method for controlling an automatic step-wise transmission system of a vehicle including a vehicle engine as claimed in claim 1, wherein said determining step further includes the steps of:

determining whether an engine changing gear is in a neutral position;

determinig whether a water temperature of the vehicle engine exceeds a predetermined temperature; and, determining whether the vehicle engine is being subjected to a load.

3. A method for regulating an automatic step-wise transmission system of a vehicle including a vehicle engine, comprising the steps of:

sensing real throttle-valve opening degree sensor data of the vehicle engine;

determining whether the vehicle engine is under start-up conditions when said real throttle-valve opening degree sensor data is sensed;

calculating a difference between said real throttle-valve opening degree sensor data sensed under the start-up conditions and reference throttle-valve opening degree data previously stored so as to obtain a correction value for said real throttle-valve opening degree sensor data;

correcting said real throttle-valve opening degree data by adding said correction value to produce controlling throttle-valve opening degree data; and controlling the automatic step-wise transmission system by inputting said controlling throttle-valve opening degree data so as to produce a gear-changing control signal and to perform a gear-changing operation of the vehicle engine, wherein said automatic vehicle transmission system regulating step includes the step of:

slip-controlling a torque converter by inputting said controlling throttle-valve opening degree data to a shift valve.

4. A method for regulating an automatic step-wise transmission system of a vehicle including a vehicle engine, comprising the steps of:

sensing real throttle-valve opening degree sensor data of the vehicle engine;

determining whether the vehicle engine is under start-up conditions when said real throttle-valve opening degree sensor data is sensed;

calculating a difference between said real throttle-valve opening degree sensor data sensed under the start-up conditions and reference throttle-valve opening degree data previously stored so as to obtain a correction value for said real throttle-valve opening degree sensor data;

correcting said real throttle-valve opening degree data by adding said correction value to produce controlling throttle-valve opening degree data; and controlling the automatic step-wise transmission system by inputting said controlling throttle-valve opening degree data so as to produce a gear-changing control signal and to perform a gear-changing operation of the vehicle engine, wherein said automatic vehicle transmission system regulating step includes the step of:

direct-controlling a torque converter by inputting said controlling throttle-valve opening degree data to a shift valve.

5. A method for regulating an automatic step-wise transmission system of a vehicle including a vehicle engine, comprising the steps of:

sensing first real throttle-valve opening degree sensor data of the vehicle engine;

determining whether the vehicle engine is in a start-up status when said first real throttle-valve opening degree data is sensed;

calculating a difference between said first real throttle-valve opening degree sensor data sensed under the start-up status and reference throttle-valve opening degree data previously stored so as to obtain a first correction value for said first real throttle-valve opening degree sensor data;

correcting said first real throttle-valve opening degree sensor data by adding said first correction value to produce first controlling throttle-valve opening degree data;

changing a shift valve after determining whether a gear-changing operation is required based upon said first controlling throttle-valve opening degree sensor data;

sensing second real throttle-valve opening degree sensor data of the vehicle engine;

determining whether the vehicle engine is in a start-up status when said second real throttle-valve opening degree sensor data is sensed;

calculating a second difference between said second real throttle-valve opening degree sensor data sensed under said start-up status and said reference throttle-valve opening degree data previously stored so as to obtain a second correction value for said second real throttle-valve opening degree sensor data;

correcting said second real throttle-valve opening degree sensor data by adding said second correction value to produce second controlling throttle-valve opening degree data; and, controlling the automatic step-wise transmission system by inputting to said shift valve said second controlling throttle-valve opening degree data so as to accomplish the gear-changing operation of the vehicle engine.

* * * * *